(12) United States Patent
Halferty et al.

(10) Patent No.: US 9,118,767 B1
(45) Date of Patent: Aug. 25, 2015

(54) COMMUNICATION DEVICE AUDIO CONTROL TO COMBINE INCOMING AUDIO AND SELECT OUTGOING AUDIO DESTINATIONS

(71) Applicant: Sprint Communications Company L.P., Overland Park, KS (US)

(72) Inventors: Clark Douglas Halferty, Lee's Summit, MO (US); Andrew Mark Wurtenberger, Olathe, KS (US); Bryan Timothy Barbee, Olathe, KS (US); Gregory Thomas Nohalty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 185 days.

(21) Appl. No.: 13/852,867

(22) Filed: Mar. 28, 2013

(51) Int. Cl.
*H04M 3/42* (2006.01)
*H04M 3/56* (2006.01)
*H04B 7/00* (2006.01)

(52) U.S. Cl.
CPC ................................... *H04M 3/568* (2013.01)

(58) Field of Classification Search
CPC ............................................. H04M 2203/5018
USPC ......................................................... 455/416
See application file for complete search history.

(56) References Cited

U.S. PATENT DOCUMENTS

| | | |
|---|---|---|
| 5,259,035 A | 11/1993 | Peters et al. |
| 5,539,741 A | 7/1996 | Barraclough et al. |
| 6,453,022 B1 | 9/2002 | Weinman, Jr. |
| 6,501,739 B1 | 12/2002 | Cohen |
| 6,674,842 B2 | 1/2004 | Weinman, Jr. |
| 7,006,616 B1 | 2/2006 | Christofferson et al. |
| 7,583,956 B2 | 9/2009 | Sammarco |
| 2002/0150220 A1 | 10/2002 | Weinman |
| 2003/0112947 A1 | 6/2003 | Cohen |
| 2003/0114147 A1 | 6/2003 | Goss et al. |
| 2005/0068904 A1 | 3/2005 | Wildfeuer et al. |
| 2006/0109803 A1 | 5/2006 | Takeshima et al. |
| 2007/0111743 A1* | 5/2007 | Leigh et al. ................... 455/518 |

(Continued)

FOREIGN PATENT DOCUMENTS

EP    1780710    5/2007

OTHER PUBLICATIONS

Carlos Avendano; "Frequency-domain Source Identification and Manipulation in Stereo Mixes for Enhancement, Suppression and Re-panning Applications;" 2003 IEEE Workshop on Applications of Signal Processing to Audio and Acoustics; Oct. 19-22, 2003; pp. 55-58; New Paltz, NY.

(Continued)

*Primary Examiner* — Huy C Ho

(57) ABSTRACT

A user communication device establishes a first call with a first caller. During the first call, the user communication device receives a call alert for a second call from a second caller. In response to receiving the call alert during the first call, the user communication device presents an option to the user to combine the first caller audio with second caller audio and to transfer the user audio for delivery to the second caller and not to the first caller. The user communication device receives an instruction from the user, and in response, receives and transfers the user audio for delivery to the second caller and not to the first caller. The user communication device receives and plays the first caller audio and the second caller audio.

20 Claims, 7 Drawing Sheets

(56) References Cited

U.S. PATENT DOCUMENTS

| | | | |
|---|---|---|---|
| 2007/0288562 A1* | 12/2007 | Shaffer et al. | 709/204 |
| 2008/0082326 A1 | 4/2008 | Venkataraman et al. | |
| 2008/0096515 A1 | 4/2008 | Kim | |
| 2009/0225970 A1 | 9/2009 | Grigsby et al. | |
| 2010/0015945 A1 | 1/2010 | Shuman et al. | |
| 2011/0044474 A1 | 2/2011 | Grover et al. | |
| 2013/0143529 A1* | 6/2013 | Leppanen | 455/411 |

OTHER PUBLICATIONS

Adobe Systems Incorporated; "Adobe Audition 3 User Guide;" XP-002655085; 2007; 294 pages; Adobe Systems Incorporated; San Jose, CA.

* cited by examiner though shown in US 9,118,767 B1 format.

COMMUNICATION DEVICE AUDIO CONTROL TO COMBINE INCOMING AUDIO AND SELECT OUTGOING AUDIO DESTINATIONS

TECHNICAL BACKGROUND

Voice calling includes the exchange of audio between users. Other media sessions, such as video conferences and music transfers, may also include the exchange of audio between users. Innovative voice calling features have been developed for the exchange of audio, such as thee-way calling and conference calling. Typically, these features are deployed in single networks or require special purpose conferencing platforms.

Some wireless networks directly support voice calling, such as Voice over Long Term Evolution (VoLTE), Code Division Multiple Access (CDMA), and Global System for Mobile communications (GSM) networks. Some wireless networks support Internet Protocol (IP) communications, such as LTE, GSM, CDMA, EVolution Data Optimized (EVDO), High Speed Packet Access (HSPA), Wireless Fidelity (WiFi), and Bluetooth networks. Other communication networks also support IP communications, such as Ethernet, Data Over Cable Service Interface Specification (DOCSIS) networks, and the like.

The use of Voice Over Internet Protocol (VOIP) for voice calling is now prolific. Thus, a situation exists where user communication devices have voice calling capabilities over multiple diverse networks. Unfortunately, the user communication devices are not properly designed to efficiently and effectively implement advanced audio features over multiple diverse networks.

TECHNICAL OVERVIEW

A user communication device establishes a first call with a first caller. During the first call, the user communication device receives a call alert for a second call from a second caller. In response to receiving the call alert during the first call, the user communication device presents an option to the user to combine the first caller audio with second caller audio and to transfer the user audio for delivery to the second caller and not to the first caller. The user communication device receives an instruction from the user, and in response, receives and transfers the user audio for delivery to the second caller and not to the first caller. The user communication device receives and plays the first caller audio and the second caller audio.

DETAILED DESCRIPTION

Figure 1:
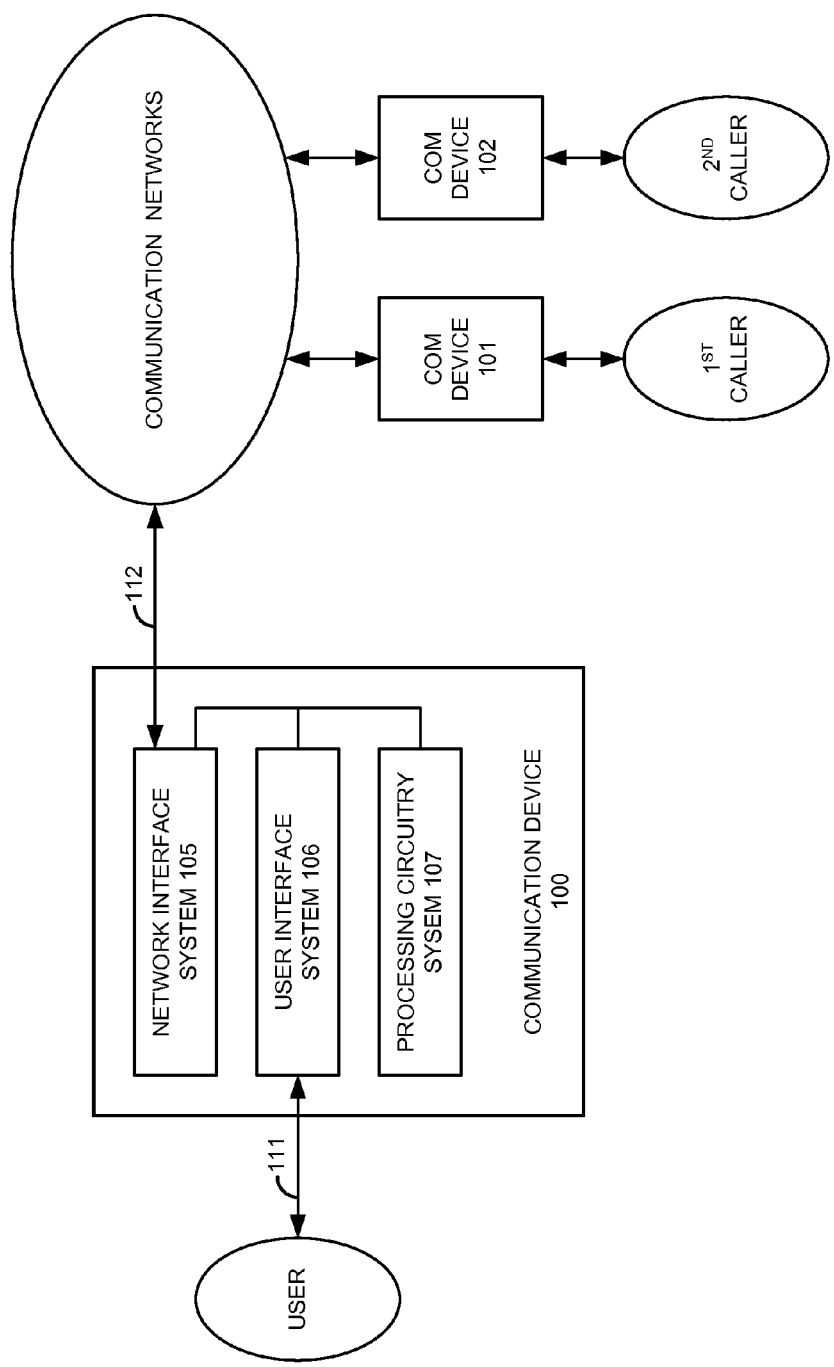
FIG. 1 illustrates a communication device that combines incoming audio and controls the destination of outgoing audio over multiple communication networks.

FIG. 1 illustrates communication device 100 that combines incoming audio and controls the destination of outgoing audio over multiple communication networks. Communication device 100 includes network interface system 105, user interface system 106, and processing circuitry system 107. User interface system 106 exchanges information 111 with a user. Information 111 comprises call alerts, user options, user instructions, and audio. Information 111 typically includes other items as well, such as video, e-mail, web pages, and the like. Network interface system 105 exchanges signals 112 with various communication networks. Signals 112 comprise call signaling and audio data—and typically other items as well, such as video, e-mail, web pages, and the like.

Communication device 100 might be a phone, computer, media player, wireless transceiver, or some other apparatus with communication networking components. Some conventional aspects of communication device 100 are omitted for clarity, such as an enclosure, power supply, and the like. Note that communication device 100 may also be integrated within other systems and devices, such as vehicles, appliances, apparel, and the like. Communication devices 101-102 could be similar to communication device 100.

In operation, the user instructs communication device 100 to initiate a first media call to a first caller. In response, communication devices 100 and 101 exchange network signaling and audio over at least one of the communication networks. Thus, the user and the first caller can hear one another over a first call. Note that the first caller could have initiated the first call instead of the user.

During the first call, a second caller instructs communication device 102 to initiate a media call to the user. In response, communication devices 100 and 102 exchange network signaling and audio over one or more of the communication networks. During this portion of the two calls, communication device 100 receives and plays audio from both the first caller and the second caller, but communication device 101 and the first caller do not receive any audio from the user. Thus, the user and the second caller can now hear one another over the second call, and the user can still hear the first caller over the first call. The first caller cannot hear the user over the first call. The first and second callers still cannot hear one another at this point. Note that the user could have initiated the second call instead of the second caller.

In some examples, the user also controls the audio volume for the calls when answering the second call and selecting the audio option. In these examples, the user may opt to have the volume of the first caller attenuated but still audible while they converse with the second caller and monitor the first caller.

During the portion of the two calls when the first caller cannot hear the user, the user may instruct communication device 100 to deliver their user audio to the first caller and not to the second caller (while still receiving the audio of both callers). In response, communication device 100 and the participating communication networks would transfer the user audio to the first caller over communication device 101 but not to communication device 102. The first and second callers still cannot hear one another at this point.

During the portion of the two calls when the first caller cannot hear the user, the user may instruct communication device 100 to deliver their user audio to both callers. In response, communication device 100 and the participating communication networks would transfer the user audio to the first caller over communication device 101 and to the second caller over communication device 102. The first and second callers still cannot hear one another at this point.

The communication networks comprise wireless networks, IP networks, telephony networks, video networks, and the like. Note that one communication network may transfer audio while hosting another communication network that also transfers audio. For example, a wireless network may provide voice calling and IP network access, where an IP network provides a separate voice calling capability over the wireless network.

Network interface system 105 comprises communication circuitry and software to support multiple protocols, such as combinations of LTE, CDMA, GSM, EVDO, HSPA, WIFI, Bluetooth, IP, Ethernet, DOCSIS, and the like. User interface system 106 comprises displays, speakers, microphones, switches, buttons, touchscreens, and the like. Processing circuitry system 107 comprises micro-processing circuitry, communication circuitry, memory, and software.

Figure 2:
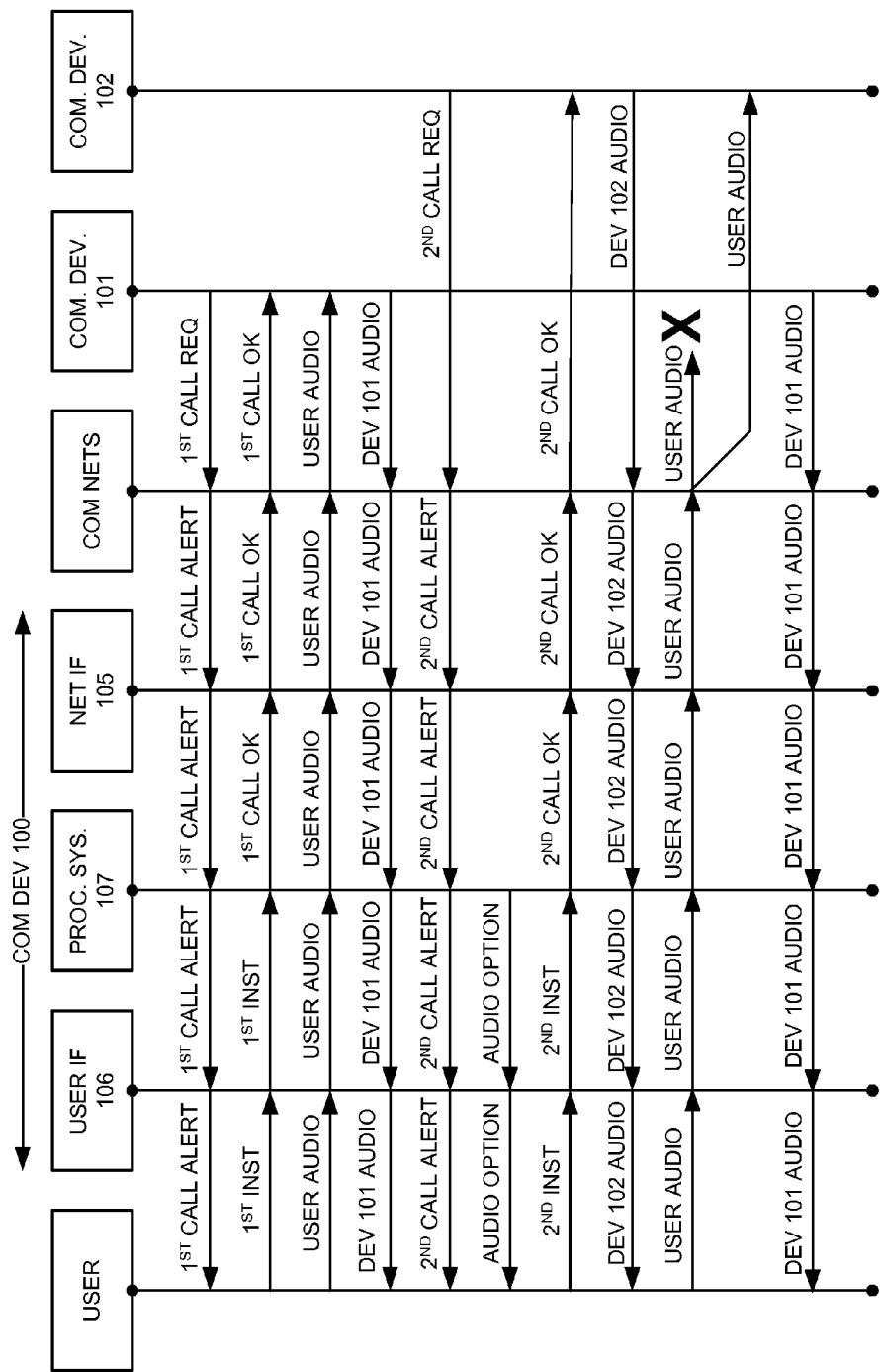
FIG. 2 illustrates an operational sequence for a communication device to combine incoming audio and control the destination of outgoing audio over multiple communication networks.

FIG. 2 illustrates an operational sequence for communication device 100 to combine incoming audio and control the destination of outgoing audio over multiple communication networks. Communication device 101 transfers a first call request for a call with the user to one of the communication networks. The call could be for a voice session, video session, or some other communication session where audio is exchanged. The call request could be directed to a wireless network, IP network, or some other communication network. The call request might use SIP, CDMA, GSM, VoLTE, or some other protocol.

One the communication networks receives the first call request, and that network or another transfers a corresponding first call alert to network interface system 105 in communication device 100. The first call alert might use SIP, CDMA, GSM, VoLTE, or some other protocol. Network interface system 105 indicates the first call alert to processing circuitry system 107. Processing circuitry system 107 drives user interface system 106 to present the first call alert to the user—typically through the use of a tone, vibration, display, and the like.

The user provides a first instruction to accept the first call to user interface system 106, and user interface system 106 informs processing circuitry system 107 of the first user instruction. Processing circuitry system 107 directs network interface system 105 to accept the first call, and network interface system 105 transfers signaling indicating acceptance of the first call to the terminating communication network. The originating communication network sends signaling indicating acceptance of the first call to communication device 101. At this point, the first call is established and communication devices 100 and 101 exchange audio for their respective users.

During the first call, communication device 102 transfers a second call request for a media call with the user to one of the communication networks. The second call could be for a voice session, video session, or some other communication session where audio is exchanged. The second call request could be directed to a wireless network, IP network, or some other communication network. The second call request might use SIP, CDMA, GSM, VoLTE, or some other protocol.

One the communication networks receives the second call request, and that network or another transfers a corresponding second call alert to network interface system 105 in communication device 100. The second call alert might use SIP, CDMA, GSM, VoLTE, or some other protocol. Network interface system 105 indicates the second call alert to processing circuitry system 107. Processing circuitry system 107 drives user interface system 106 to present the second call alert to the user along with an audio option than can be integrated within the second call alert. The audio option would typically be displayed for user selection along with accepting the call.

The audio option is to combine the audio from the first call and the second call for play-out to the user, and to direct the user audio to the second call but not to the first call. In response to the presented option, the user provides a second instruction through user interface system 106 to accept the second call using the audio option, and user interface system 106 informs processing circuitry system 107 of the second user instruction. Processing circuitry system 107 directs network interface system 105 to accept the second call, and network interface system 105 transfers signaling indicating acceptance of the second call to the terminating communication network. The originating communication network sends signaling indicating acceptance of the second call to communication device 102. At this point, the second call is established and communication devices 100 and 102 exchange audio for their respective users. Contemporaneously, the first call is modified so communication device 100 receives audio from communication device 101, but communication device 101 does not receive audio from communication device 100.

This modification of the first call responsive to the user acceptance of the second call can be accomplished in various ways depending on the participating communication networks. To combine incoming audio, communication device 100 may internally combine the received audio from both calls (whether IP, wireless, or another format) for play-out to the user. Alternatively, communication device 100 may direct one of the communication networks to combine the audio from both calls for play-out to the user through signaling, such as SIP messaging, CDMA signaling, and the like.

To direct outgoing audio, communication device 100 may block the transfer of user voice data for delivery to communication device 101. For example, communication device 100 might drop outbound voice packets for the first call, or device 100 might load silence into the reverse voice frames for the first call in a wireless protocol. In other examples, communication device 100 blocks the transfer of user voice data to communication device 101 through signaling, such as SIP messaging, CDMA signaling, and the like.

Figure 3:
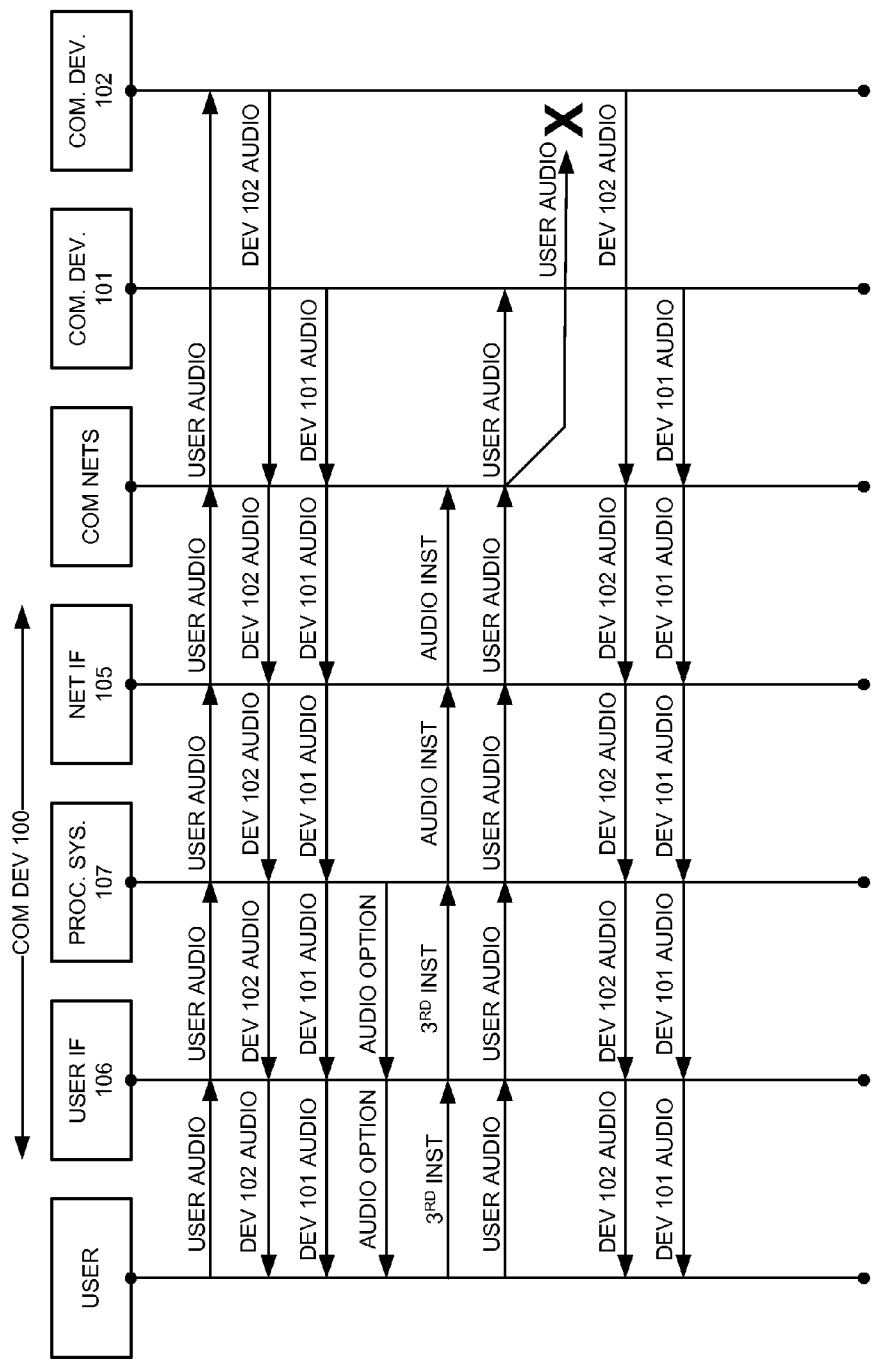
FIG. 3 illustrates an operational sequence for a communication device to combine incoming audio and control the destination of outgoing audio over multiple communication networks.

FIG. 3 illustrates an operational sequence for a communication device to combine incoming audio and control the destination of outgoing audio over multiple communication networks. At the beginning of the sequence, a first call and a second call are already established where the user audio is delivered to communication device 102, but not to communication device 101. The user receives audio from both communication devices 101-102.

Responsive to this call state, processing circuitry system 107 drives user interface system 106 to present an audio option to the user. The audio option would typically be displayed for user selection. The audio option is to combine the audio from the first call and the second call for play-out to the user, and to direct the user audio back to the first call but not to the second call. In response to the presented option, the user provides a third instruction to user interface system 106 to implement the audio option, and user interface system 106 informs processing circuitry system 107 of the third user instruction.

At this point, the first and second calls are modified so communication device 100 receives audio from communication devices 101 and 102, and communication device 101 receives audio from communication device 100, but communication device 102 does not receive audio from communication device 100. The modification of the calls responsive to the third user instruction can be accomplished in various ways depending on the participating communication networks.

To direct the outgoing audio, communication device 100 may block the transfer of user voice data for delivery to communication device 102 and restart the transfer of user voice data for delivery to communication device 102. For example, communication device 100 might drop outbound voice packets or load silence into the reverse voice frames for the second call while reversing this blocking process for the first call. In other examples, communication device 100 blocks the transfer of user voice data to communication device 102 and restarts the transfer of user voice data to communication device 101 through signaling, such as SIP messaging, CDMA signaling, and the like.

Figure 4:
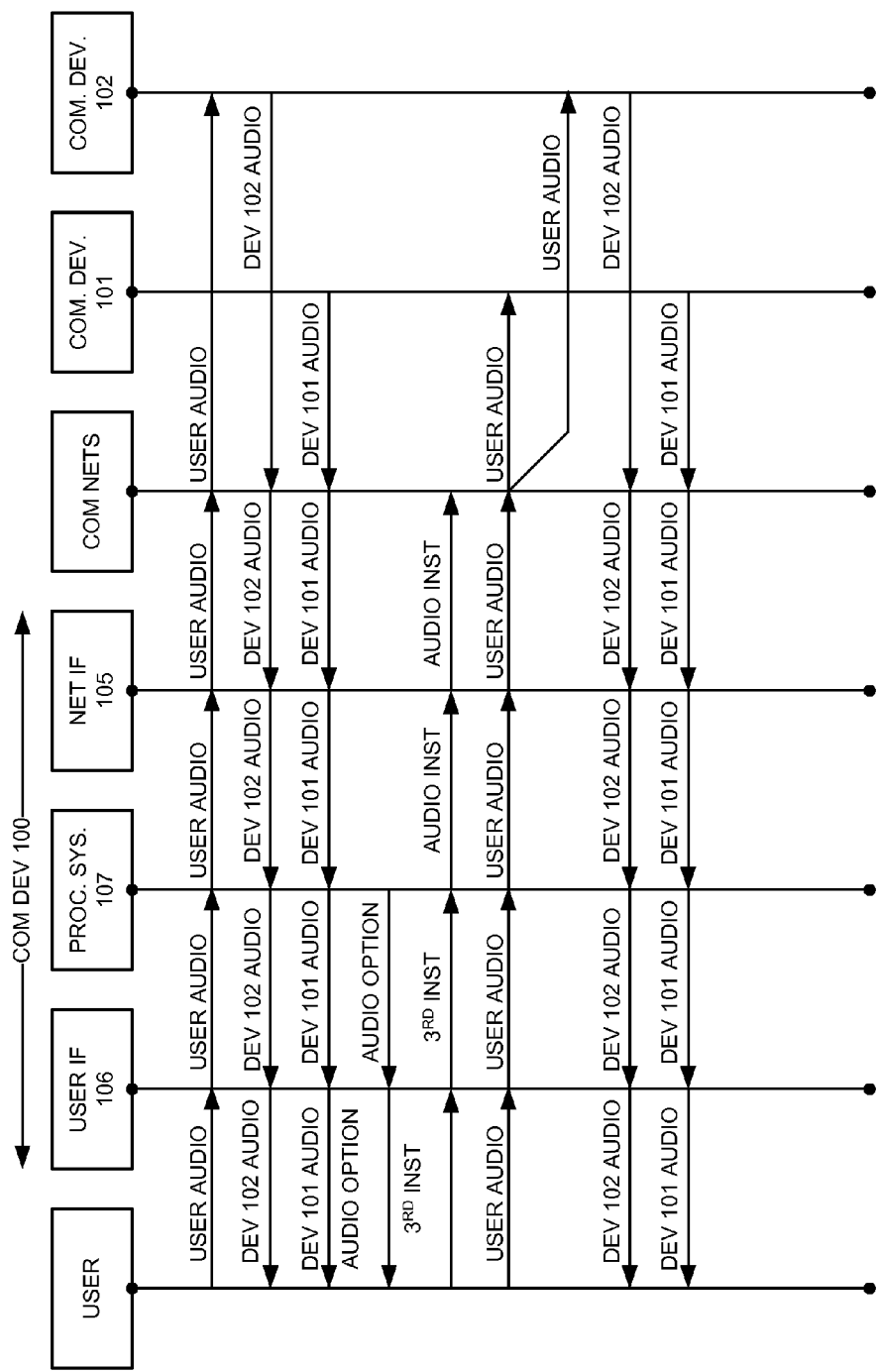
FIG. 4 illustrates an operational sequence for a communication device to combine incoming audio and control the destination of outgoing audio over multiple communication networks.

FIG. 4 illustrates an operational sequence for a communication device to combine incoming audio and control the destination of outgoing audio over multiple communication networks. At the beginning of the sequence, a first call and a second call are already established where the user audio is delivered to communication device 102, but not to communication device 101. The user receives audio from both communication devices 101-102.

Responsive to this call state, processing circuitry system 107 drives user interface system 106 to present an audio option to the user. The audio option would typically be displayed for user selection. The audio option is to combine the audio from the first call and the second call for play-out to the user, and to direct the user audio to both the first call and to the second call —communication devices 101-102 would still remain isolated from one another in this option and could not hear one another. In response to the presented option, the user provides a third instruction to user interface system 106 to implement the audio option, and user interface system 106 informs processing circuitry system 107 of the third user instruction.

At this point, the first and second calls are modified so communication device 100 receives audio from communication devices 101 and 102, and communication devices 101 and 102 receive audio from communication device 100. The modification of the calls responsive to the third user instruction can be accomplished in various ways depending on the participating communication networks. To direct the outgoing audio, communication device 100 may restart the transfer of user voice data for delivery to communication device 101 while maintaining the transfer of user voice data to communication device 102. For example, communication device 100 might restart the transfer of voice packets or restart loading user voice data into reverse voice frames for the first call. In other examples, communication device 100 may restart the transfer of user voice data to communication device 101 through signaling, such as SIP messaging, CDMA signaling, and the like.

Figure 5:
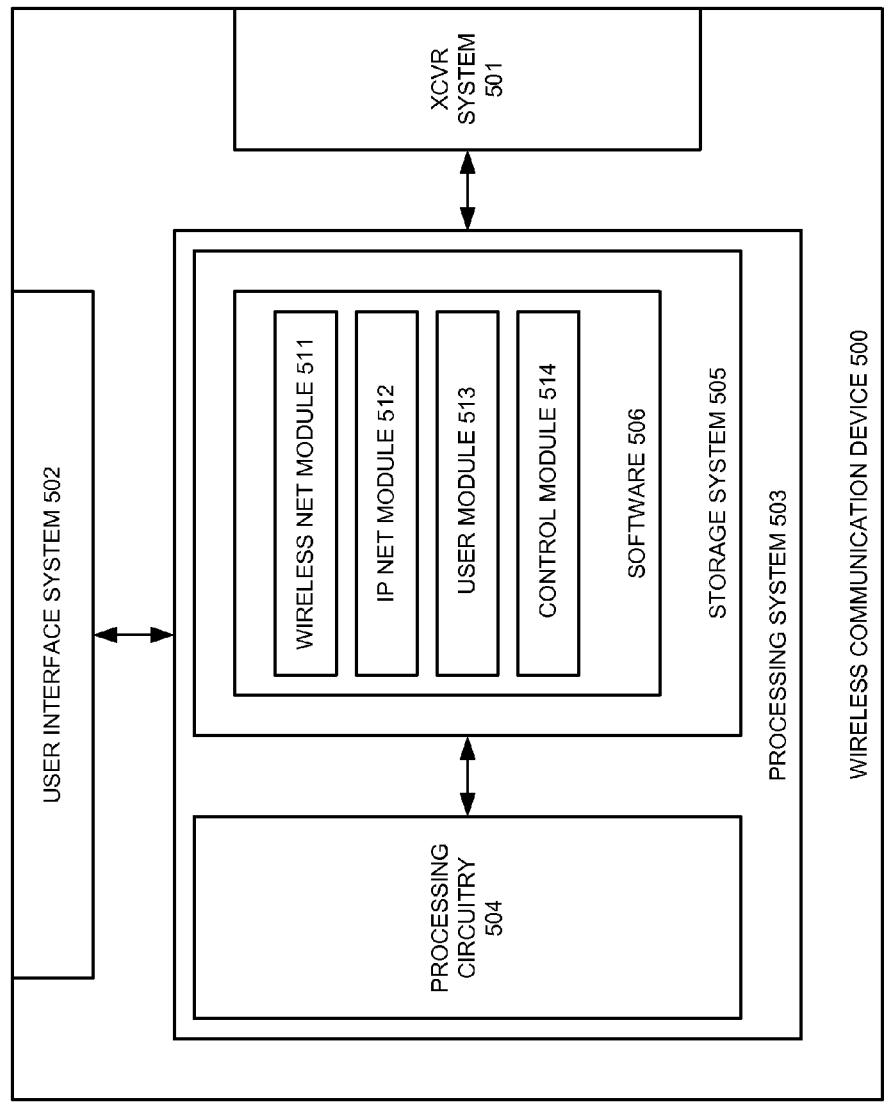
FIG. 5 illustrates a communication device that combines incoming audio and controls the destination of outgoing audio over multiple communication networks.

FIG. 5 illustrates wireless communication device 500 that combines incoming audio and controls the destination of outgoing audio over multiple communication networks. Wireless communication device 500 is an example of the communication devices described herein, although these devices may use alternative configurations. Wireless communication device 500 comprises transceiver system 501, user interface system 502, and processing system 503. Processing system 503 comprises processing circuitry 504 and storage system 505. Storage system 505 stores software 506. Wireless communication device 500 may be integrated within other systems and may be distributed across multiple diverse computer and communication systems. Some conventional aspects of wireless communication device 500 are omitted for clarity, such as power supplies, enclosures, and the like.

Transceiver system 501 comprises communication components, such as antennas, ports, filters, amplifiers, circuitry, memory, software, and the like. Transceiver system 501 uses multiple protocols such as combinations of LTE, CDMA, GSM, EVDO, HSPA, WIFI, Bluetooth, IP, Ethernet, DOCSIS, or some other communication format.

User interface system 502 comprises displays, touch-screens, speakers, microphones, vibrators, switches, buttons, lights, and/or some other human-to-machine interfaces.

Processing circuitry 504 comprises circuit boards that hold integrated circuitry and associated electronics. Storage system 505 comprises non-transitory, machine-readable, data storage media, such as flash drives, disc drives, and the like. Software 506 comprises machine-readable instructions that control the operation of processing circuitry 504 when executed. Software 506 includes modules 511-514 and may also include operating systems, applications, utilities, databases, and the like. All or portions of software 506 may be externally stored on flash drives, discs, servers, and the like.

When executed by processing circuitry 504, wireless network module 511 directs circuitry 504 to interact with one or more wireless networks as described herein. When executed by processing circuitry 504, IP network module 511 directs circuitry 504 to interact with one or more IP networks as described herein. When executed by processing circuitry 504, user module 513 directs circuitry 504 to interact with the user as described herein. When executed by processing circuitry 504, control module 514 directs circuitry 504 to control received audio combinations and to control the destination of outbound audio as described herein.

Figure 6:
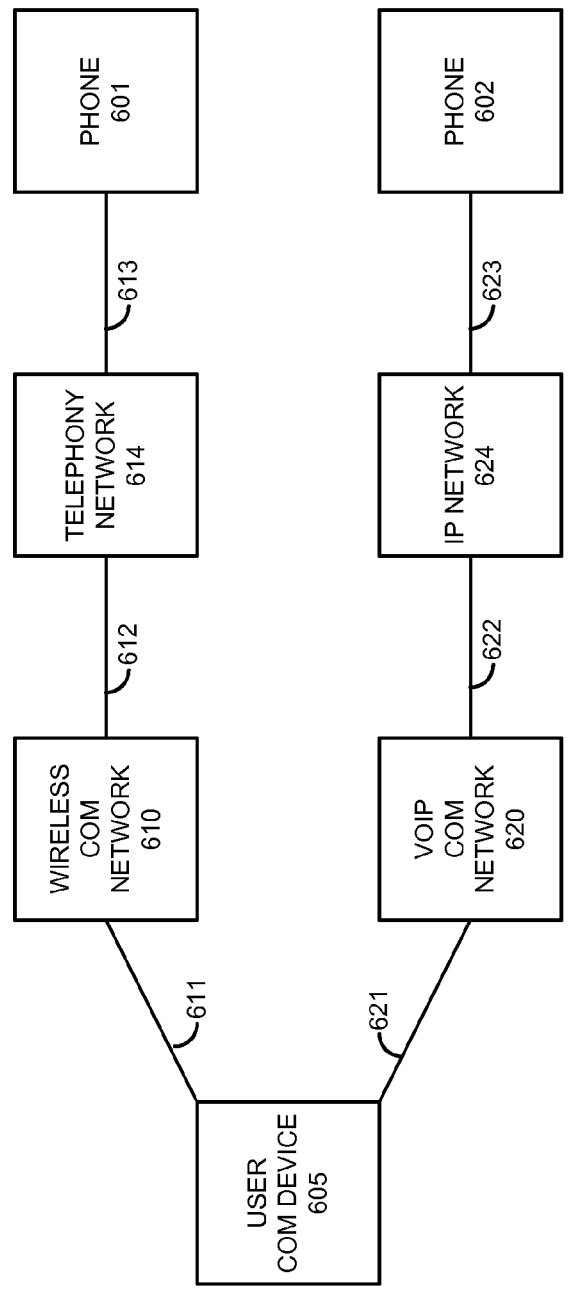
FIG. 6 illustrates a wireless communication device that combines incoming audio and controls the destination of outgoing audio over a wireless communication network and an IP communication network.

FIG. 6 illustrates wireless communication device 605 that combines incoming audio and controls the destination of outgoing audio over wireless communication network 610 and VOIP communication network 620. Consider an example where user communication device 605 and phone 601 are engaged on a first wireless voice call and exchange audio data over networks 610 and 614 and links 611-613. Phone 602 now requests an IP voice call with user communication device 605, and device 605 presents the user with an option to accept the IP voice call from phone 602 while continuing to monitor audio from phone 601. If the user selects this option, user communication device 605 either: 1) stops transferring voice data over reverse wireless link 611 for delivery to phone 601, or 2) sends signaling to wireless communication network 610 to stop the delivery of the user audio to phone 601. If wireless communication network 610 is a CDMA network, then this network signaling could be a flash-with-info message.

Responsive to the user selection, user communication device 605 may internally combine the audio from networks 610 and 620 for both calls. In alternative examples where wireless communication network 610 hosts VOIP communication network 620, user communication device 605 may signal a system within wireless communication network 610 (packet gateway, application server, Internet access node, or the like) to combine the audio for both calls.

Consider another example where user communication device 605 and phone 602 are engaged on a first IP voice call and exchange audio data over networks 620 and 624 and links 621-623. Phone 601 now requests a wireless voice call with user communication device 605, and device 605 presents the user with an option to accept the voice call from phone 601 while continuing to monitor audio from phone 602. If the user selects this option, user communication device either: 1) stops transferring voice packets addressed to phone 602, or 2) sends signaling to VOIP communication network 610 to stop the delivery of the user audio to phone 602. For VOIP communication network 620, this network signaling could be a SIP message.

Responsive to the user selection, user communication device 605 may internally combine the audio from networks 610 and 620 for both calls. In alternative examples where wireless communication network 610 hosts VOIP communication network 620, user communication device 605 may signal a system within wireless communication network 610 (packet gateway, application server, Internet access node, or the like) to combine the audio for both calls.

Figure 7:
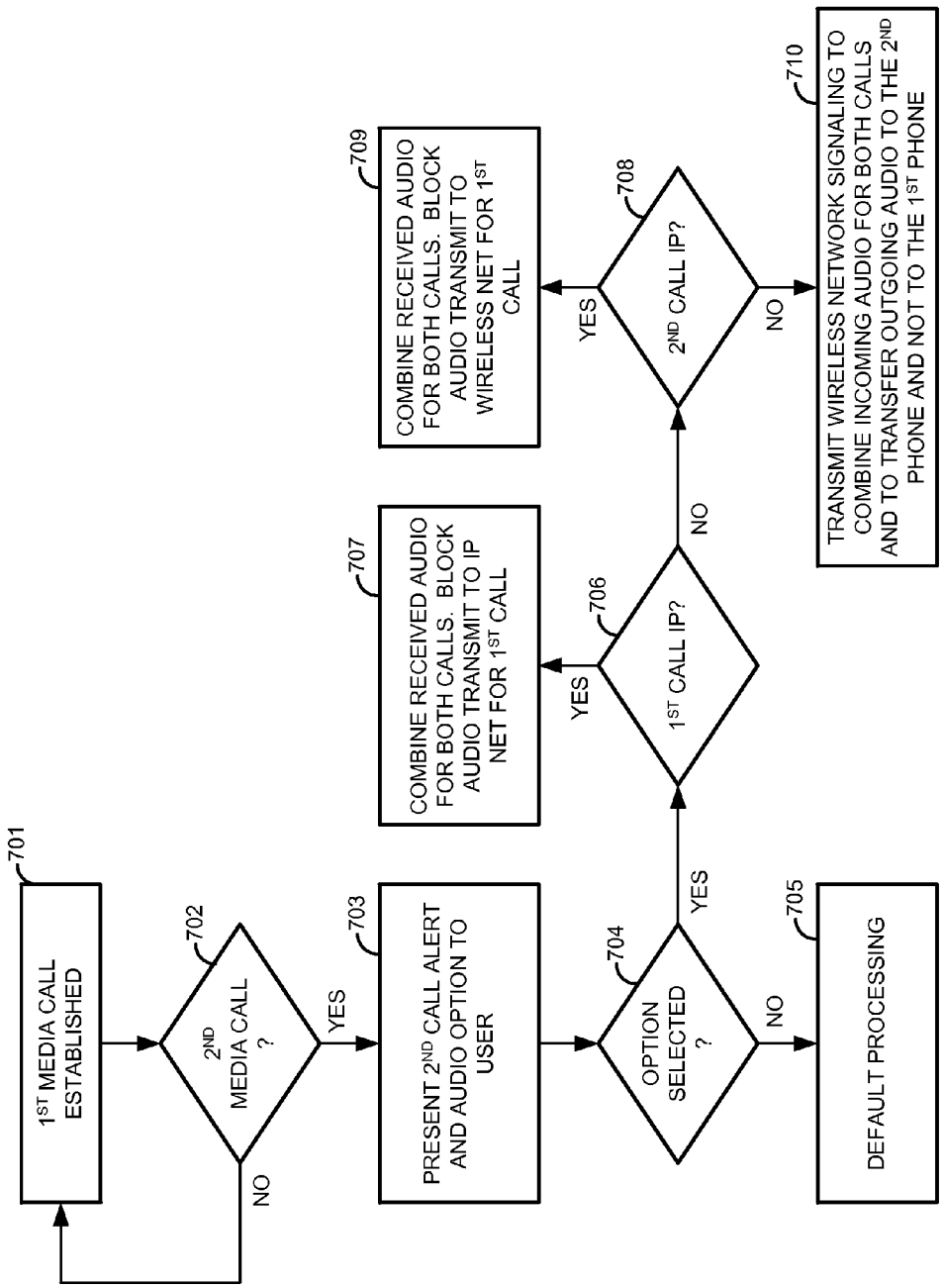
FIG. 7 illustrates an operational flow for a wireless communication device to combine incoming audio and control the destination of outgoing audio over a wireless communication network and an IP communication network.

FIG. 7 illustrates an operational flow for a user communication device to combine incoming audio and control the destination of outgoing audio over wireless communication networks and IP communication networks. The user communication device is engaged on a first media call and exchanges audio data with another communication device (701). If the user communication device receives an alert for a second media call during the first media call (702), then the user communication device presents the user with an option to accept the second media call while continuing to monitor audio from the first media call (703). If the user does not select this option (704), then default processing occurs (705). If the user selects the option (704), then the user communication device determines if the first call is an IP call (706). If the first call is an IP call (706), then the user communication device: 1) combines the received audio from both calls for play-out, 2) transfers the user audio over the second call, and 3) stops transferring voice IP packets that are addressed for delivery over the first call (707).

If the first call is not an IP call (706), then the user communication device determines if the second call is an IP call (708). If the second call is an IP call (708), then the user communication device: 1) combines the received audio from both calls for play-out, 2) transfers voice IP packets that are addressed for delivery over the second call, and 3) stops transferring user voice data over the reverse wireless link for delivery over the first call (709). If the both the first call and the second are not IP calls (706, 708), then the user communication device transmits signaling to the wireless network to combine the incoming audio from both calls, but to deliver the user audio only over the second call and not the first call (710).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication device for a user, the method comprising:

during a first call with a first caller, transferring user audio to the first caller and playing first caller audio from the first caller;

during the first call and in response to a second call, presenting an option to the user to combine and play the first caller audio with second caller audio, to transfer the user audio to the second caller and not to the first caller, to not transfer the first caller audio to the second caller, and to not transfer the second caller audio to the first caller; and receiving an instruction from the user, and in response, transferring the user audio to the second caller and not to the first caller, combining and playing the first caller audio and the second caller audio, not transferring the first caller audio to the second caller, and not transferring the second caller audio to the first caller.

2. The method of claim 1 further comprising:

during the first call and the second call, presenting another option to the user to combine the first caller audio and the second caller audio and to transfer the user audio for delivery to the first caller and not to the second caller; and receiving another instruction from the user, and in response, receiving and transferring the user audio for delivery to the first caller and not to the second caller and receiving and playing the first caller audio and the second caller audio.

3. The method of claim 1 further comprising:

during the first call and the second call, presenting another option to the user to combine the first caller audio and the second caller audio and to transfer the user audio for delivery to the first caller and to the second caller; and receiving another instruction from the user, and in response, receiving and transferring the user audio for delivery to the first caller and to the second caller and receiving and playing the first caller audio and the second caller audio.

4. The method of claim 1 wherein the first call comprises a Code Division Multiple Access (CDMA) voice call and the second call comprises an Internet-Protocol (IP) voice call.

5. The method of claim 1 wherein the first call comprises an Internet-Protocol (IP) voice call and the second call comprises a Code Division Multiple Access (CDMA) voice call.

6. The method of claim 1 wherein the first call comprises a Long Term Evolution (LTE) voice call and the second call comprises an Internet-Protocol (IP) voice call.

7. The method of claim 1 wherein the first call comprises an Internet-Protocol (IP) voice call and the second call comprises a Long Term Evolution (LTE) voice call.

8. The method of claim 1 wherein receiving and playing the first caller audio and the second caller audio comprises receiving Internet-Protocol (IP) voice packets and wireless network voice signals and combining audio data from the IP voice packets and the wireless network voice signals.

9. The method of claim 1 wherein receiving and playing the first caller audio and the second caller audio comprises transferring a command to one of the communication networks to bridge the first caller audio with the second caller audio.

10. The method of claim 9 wherein the command comprises a flash with info message.

11. A user communication device comprising:

a user interface system configured to receive user audio for delivery to a first caller over a first call and to play first caller audio transferred by the first caller over the first call;

a network interface system configured to transfer the user audio for delivery to the first caller over the first call, to receive the first caller audio transferred by the first caller over the first call, and to receive a call alert for a second call from a second caller during the first call;

a processing system configured, in response to receiving the call alert during the first call, to drive the user interface system to present an option to the user to combine and play the first caller audio with second caller audio to transfer the user audio to the second caller and not to the first caller; and the user interface system configured to present the option to the user, receive an instruction from the user, and to play the first caller audio and the second caller audio;

the processing system configured, in response to the instruction from the user, to direct the user interface system to play the first caller audio and the second caller audio and to direct the network interface system to transfer the user audio for delivery to the second caller and not to the first caller; and the network interface system configured to transfer the user audio for delivery to the second caller and not to the first caller.

12. The user communication device of claim 11 further comprising:

the processing system is configured, in response to the instruction from the user, to direct the user interface system to present another option to the user to combine the first caller audio and the second caller audio and to transfer the user audio for delivery to the first caller and not to the second caller; and the user interface system is configured to present the other option to the user, receive another instruction from the user, and to play the first caller audio and the second caller audio;

the processing system is configured, in response to the other instruction from the user, to direct the network interface system to transfer the user audio for delivery to the first caller and not to the second caller; and the network interface system is configured to receive the first caller audio and the second caller audio and to transfer the user audio for delivery to the first caller and not to the second caller.

13. The user communication device of claim 11 further comprising:

the processing system is configured, in response to the instruction from the user, to direct the user interface system to present another option to the user to combine the first caller audio and the second caller audio and to transfer the user audio for delivery to the first caller and to the second caller; and the user interface system is configured to present the other option to the user, receive another instruction from the user, and to play the first caller audio and the second caller audio;

the processing system is configured, in response to the other instruction from the user, to direct the network interface system to transfer the user audio for delivery to the first caller and to the second caller; and the network interface system is configured to receive the first caller audio and the second caller audio and to transfer the user audio for delivery to the first caller and to the second caller.

14. The user communication device of claim 11 wherein the first call comprises a Code Division Multiple Access (CDMA) voice call and the second call comprises an Internet-Protocol (IP) voice call.

15. The user communication device of claim 11 wherein the first call comprises an Internet-Protocol (IP) voice call and the second call comprises a Code Division Multiple Access (CDMA) voice call.

16. The user communication device of claim 11 wherein the first call comprises a Long Term Evolution (LTE) voice call and the second call comprises an Internet-Protocol (IP) voice call.

17. The user communication device of claim 11 wherein the first call comprises an Internet-Protocol (IP) voice call and the second call comprises a Long Term Evolution (LTE) voice call.

18. The user communication device of claim 11 wherein the network interface system is configured to receive and combine the first caller audio and the second caller audio by receiving Internet-Protocol (IP) voice packets and wireless network voice signals and combining audio data from the IP voice packets and the wireless network voice signals.

19. The user communication device of claim 11 wherein the network interface system is configured to transfer a command to one of the communication networks to bridge the first caller audio with the second caller audio.

20. The user communication device of claim 19 wherein the command comprises a flash with info message.

* * * * *